(12) United States Patent
Takayama

(10) Patent No.: US 7,477,267 B2
(45) Date of Patent: Jan. 13, 2009

(54) DISPLAY APPARATUS AND DISPLAYING METHOD FOR THE SAME

(75) Inventor: Katsumi Takayama, Saitama-ken (JP)

(73) Assignee: FUJI FILM Corporation, Tokyo (JP)

( * ) Notice: Subject to any disclaimer, the term of this patent is extended or adjusted under 35 U.S.C. 154(b) by 470 days.

(21) Appl. No.: 11/274,198

(22) Filed: Nov. 16, 2005

(65) Prior Publication Data

US 2006/0103675 A1    May 18, 2006

(30) Foreign Application Priority Data

Nov. 18, 2004   (JP)   ............................ 2004-334657

(51) Int. Cl.
*G09G 5/00*       (2006.01)
*G06F 12/02*     (2006.01)

(52) U.S. Cl. ....................... 345/634; 345/543
(58) Field of Classification Search ................. 345/543, 345/629–634
See application file for complete search history.

(56) References Cited

U.S. PATENT DOCUMENTS

| 5,999,160 A | 12/1999 | Kitamura et al. ............. 715/202 |
| 6,504,575 B1 | 1/2003 | Ramirez et al. ........ 348/333.02 |
| 2003/0201998 A1 | 10/2003 | Muraki et al. ................ 345/629 |

FOREIGN PATENT DOCUMENTS

| JP | A 09-205597 | 8/1997 |
| JP | A 11-212539 | 8/1999 |

*Primary Examiner*—Ryan R Yang
(74) *Attorney, Agent, or Firm*—Margaret A. Burke; Sheldon J. Moss

(57) ABSTRACT

It is determined whether or not blocks of a main scanning direction-wise pixel line of an LCD and a sub-image data of an image information table are superposed. When they are determined to be superposed, a reading out address of the sub-image data is calculated, a sub-image block data is read out from the calculated reading out address, and the obtained sub-image block data is stored in a block buffer. After the superposition has been realized for all the sub-image data of the image information table, and then the sub-image block data have been stored in the block buffers, the plural sub-image block data stored in the block buffers are compounded.

20 Claims, 8 Drawing Sheets

DISPLAY APPARATUS AND DISPLAYING METHOD FOR THE SAME

CROSS-REFERENCE TO RELATED APPLICATION

This application claims priority under 35 USC 119 from Japanese Patent Application No. 2004-334657, the disclosure of which is incorporated by reference herein.

BACKGROUND OF THE INVENTION

1. Field of the Invention

The invention relates to a display apparatus, more particularly relates to an on-screen display apparatus which is capable of superposing and displaying an image based on a sub image data on an image based on a main-image data.

2. Description of the Related Art

A photographic apparatus such as a digital still camera and a digital video camera has, conventionally, an OSD (On-Screen Display) function of superposing a sub-image including characters such as letters based on a sub-image data on a main image such as an object image based on a main image data, and then displaying them on a display section such as a liquid crystal display (LCD) or the like. With recent advance in digital camera performance, the number of sub-image data superposed and displayed increases.

As an on-screen display apparatus which decreases CPU load without requiring a frame memory, there have been known a display control apparatus which reads out character data from a character memory and then displays them on a display apparatus (Japanese Patent Application Laid-Open (JP-A) No. 11-212539), and an on-screen display apparatus which outputs a sub-image signal using a ROM for OSD for storing pattern data such as a character font, by means of the sprite technique for use in game apparatuses, etc. ((JP-A) No. 9-205597).

However, the above-mentioned technique of JP-A No. 11-212539 has a problem that the display control apparatus cannot superpose and display the plural character data because it reads out the character data and then outputs the read out data on the display apparatus.

The above-mentioned technique of JP-A No. 9-205597 has a problem that the on-screen display apparatus requires the ROM for OSD for storing the pattern data such as the character font, which increases costs, and the apparatus cannot superpose and display the plural character fonts.

The present invention has been made in order to solve the above-mentioned problems; therefore, it provides a display apparatus, which is at a low cost in configuration, and is capable of displaying an image with the plural sub-image data superposed.

SUMMARY OF THE INVENTION

A first aspect of the invention provides a display apparatus comprising a storing section that stores a plurality of sub-image data, a display section that displays an image, and that comprises a plurality of pixel lines juxtaposed in a direction perpendicular to a predetermined direction, each of the pixel lines comprising a plurality of pixels arranged in the predetermined direction, a determining section that determines whether or not a part of the sub-image data is displayed in each block of a plurality of blocks into which the pixel line is divided, when the display section displays the sub-image data, a plurality of block storing sections, each of which stores the part of the sub-image data displayed on the block, a reading out section that reads out the part of the sub-image data displayed on the block from a storing section, and then causes any one of a plurality of the block storing sections to store the read out part of the sub-image data, when the determining section determines that the part of the sub-image data is displayed, a generating section that generates compound sub-image part data obtained by compounding the parts of the respective sub-image data stored in the block storing sections, respectively, when all the parts of the sub-image data, which are determined to be displayed, are stored in a plurality of the block storing sections by the reading out section, for one block of a plurality of the divided blocks, and a superposing and outputting section that generates superposed image data obtained by superposing the compound sub-image part data corresponding to each of the blocks of the pixel line, respectively, on the main image data corresponding to the pixel line, and then outputs the generated superposed image data on the displaying section.

According to the first aspect of the present invention, a determining section determines whether or not a part of the sub-image data is displayed in each block of the plural blocks into which the pixel line is divided, when the displaying section displays the sub-image data, a reading out section reads out the part of the sub-image data displayed on the block from the storing section, and then causes any one of the plural block storing sections to store the read out part of the sub-image data, when the determining section determines that the part of the sub-image data is displayed, a generating section generates a compound sub-image part data obtained by compounding the parts of the respective sub-image data stored in the block storing sections, respectively, when all the parts of the sub-image data, which are determined to be displayed, are stored in the plural block storing sections by the reading out section, for one block of the plural divided blocks, and a superposing output section generates a superposed image data obtained by superposing the compound sub-image part data corresponding to each of the blocks of the pixel line, respectively, on the main image data corresponding to the pixel line, and then outputs the generated superposed image data on the displaying section.

In the first aspect of the invention, since a part of the plural sub-image data displayed in each block of the pixel line of the display section is stored in the plural block storing sections, and then the stored part of the plural sub-image data are compounded, it is possible to make the configuration at a low cost and enables an image to be displayed with the plural sub-image data superposed.

In a second aspect of the invention, there is provided a display method of a display apparatus that displays a plurality of sub-images together with a main image, comprising the steps of: obtaining main image data and a plurality of sub-image data, storing the main data and the plurality of sub-image data, both of which are to be displayed, determining whether or not a part of the sub-image data is displayed in each block of a plurality of blocks into which a pixel line comprising a plurality of pixels arranged in a predetermined direction is divided, when displaying the sub-image data, reading out the part of the sub-image data displayed on the block, and then storing the read out part of the sub-image data, individually, when it is determined that the part of the sub-image data is displayed, generating compound sub-image part data obtained by compounding all the parts of the respective sub-image data stored, individually, when all the parts of the sub-image data, which are determined to be displayed, are stored, for one block of the plural divided blocks, and generating superposed image data obtained by superposing the compound sub-image part data corresponding to each of the blocks of the pixel line, respectively, on the main image data corresponding to the pixel line, and then displaying the generated superposed image data.

According to a third aspect of the invention, there is provided a digital camera having a display apparatus comprising a storing section that stores a plurality of sub-image data, a display section that displays an image, and that includes a plurality pixel lines juxtaposed in a direction perpendicular to a predetermined direction, each of the pixel lines comprising a plurality of pixels arranged in the predetermined direction, a determining section that determines whether or not a part of the sub-image data is displayed in each block of a plurality of blocks into which the pixel line is divided, when the display section displays the sub-image data, a plurality of block storing sections, each of which stores the part of the sub-image data displayed on the block, a reading out section that reads out the part of the sub-image data displayed on the block from a storing section, and then causes any one of the plural block storing sections to store the read out part of the sub-image data, when the determining section determines that the part of the sub-image data is displayed, a generating section that generates compound sub-image part data obtained by compounding the parts of the respective sub-image data stored in the block storing sections, respectively, when all the parts of the sub-image data, which are determined to be displayed, are stored in the plural block storing sections by the reading out section, for one block of the plural divided blocks, and a superposing and outputting section that generates superposed image data obtained by superposing the compound sub-image part data corresponding to each of the blocks of the pixel line, respectively, on the main image data corresponding to the pixel line, and then outputs the generated superposed image data on the displaying section.

BRIEF DESCRIPTION OF THE DRAWINGS

An embodiment of the present invention will be described in detail based on the following figures, wherein.

DETAILED DESCRIPTION OF THE INVENTION

The invention will now be described in detail showing an embodiment thereof in which a display apparatus of the present invention is applied to a digital camera.

Figure 1:
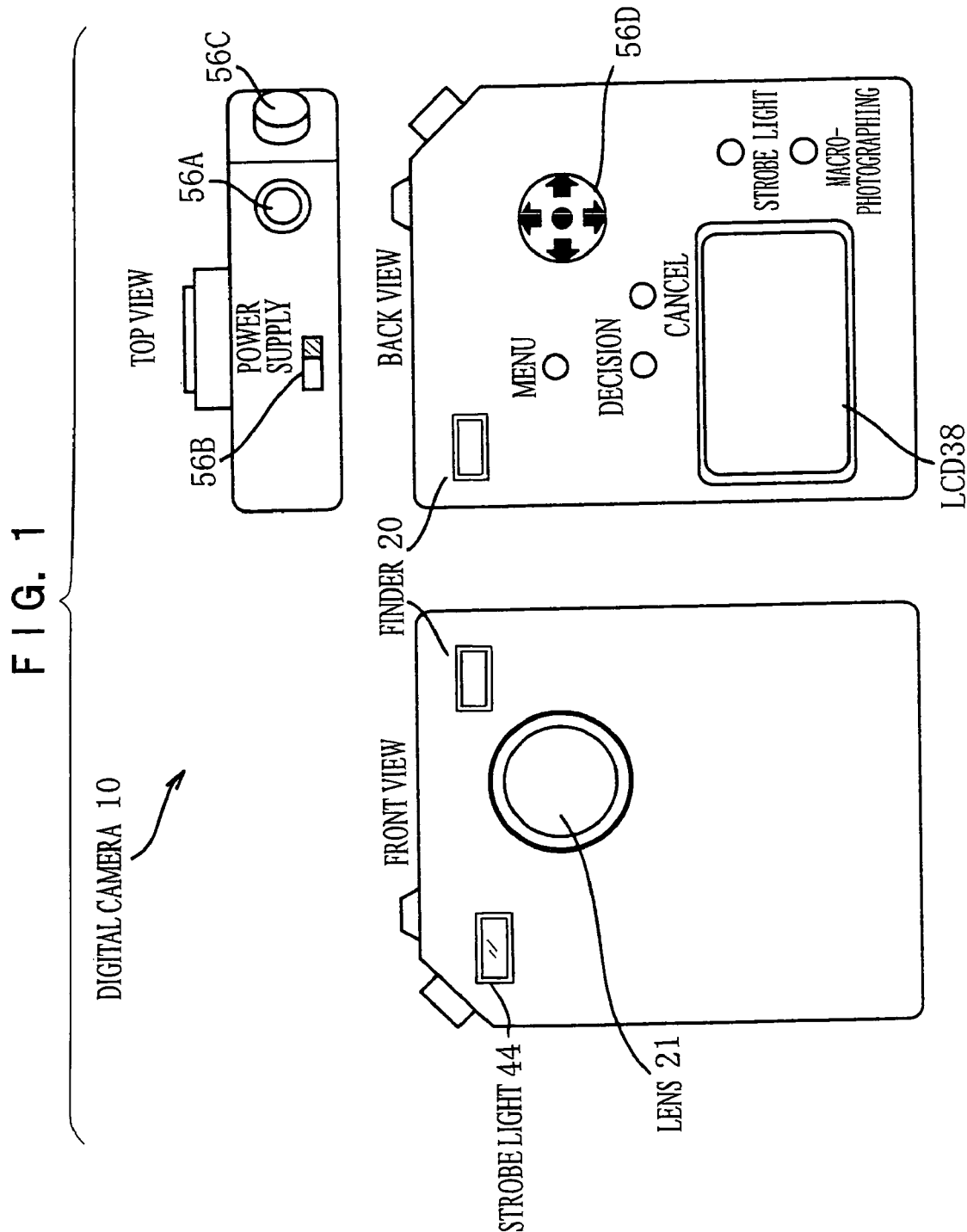
FIG. 1 is an outline view showing an outline of a digital camera according to the embodiment.

As shown in FIG. 1, a digital camera 10 has, at a front side, a lens 21 for focusing an object image, a strobe light 44 for radiating a light to a object as needed when photographing, and a finder 20 used for determining the composition of the object to be photographed, etc. The digital camera 10 has, at an upper face, a release switch 56A to be pressed when photographing, a power supply switch 56B, and a mode changing-over switch 56C used for selecting any one of a photographing mode, and a playback mode of displaying a played back object image on a liquid crystal display 38, described hereinafter.

Further, the digital camera 10 has, at a rear face, an eyepiece portion of the finder 20 mentioned above, and a liquid crystal display (hereinafter referred to as "LCD") 38 for displaying the photographed object image and a menu screen etc., and a cross-shaped cursor switch 56D.

The digital camera 10 also has, at the rear face, a menu switch to be pressed when causing the LCD 38 to display the menu screen, a decision input switch to be pressed when determining the previous operation content, a cancellation switch to be pressed when canceling the last operation content, a strobe light switch to be pressed when setting a light emitting condition of the strobe light 44, and a macro-photographing switch to be pressed when macro-photographing.

Next, a description will be given about a configuration of the major electrical configuration of the digital camera 10 according to the embodiment.

Figure 2:
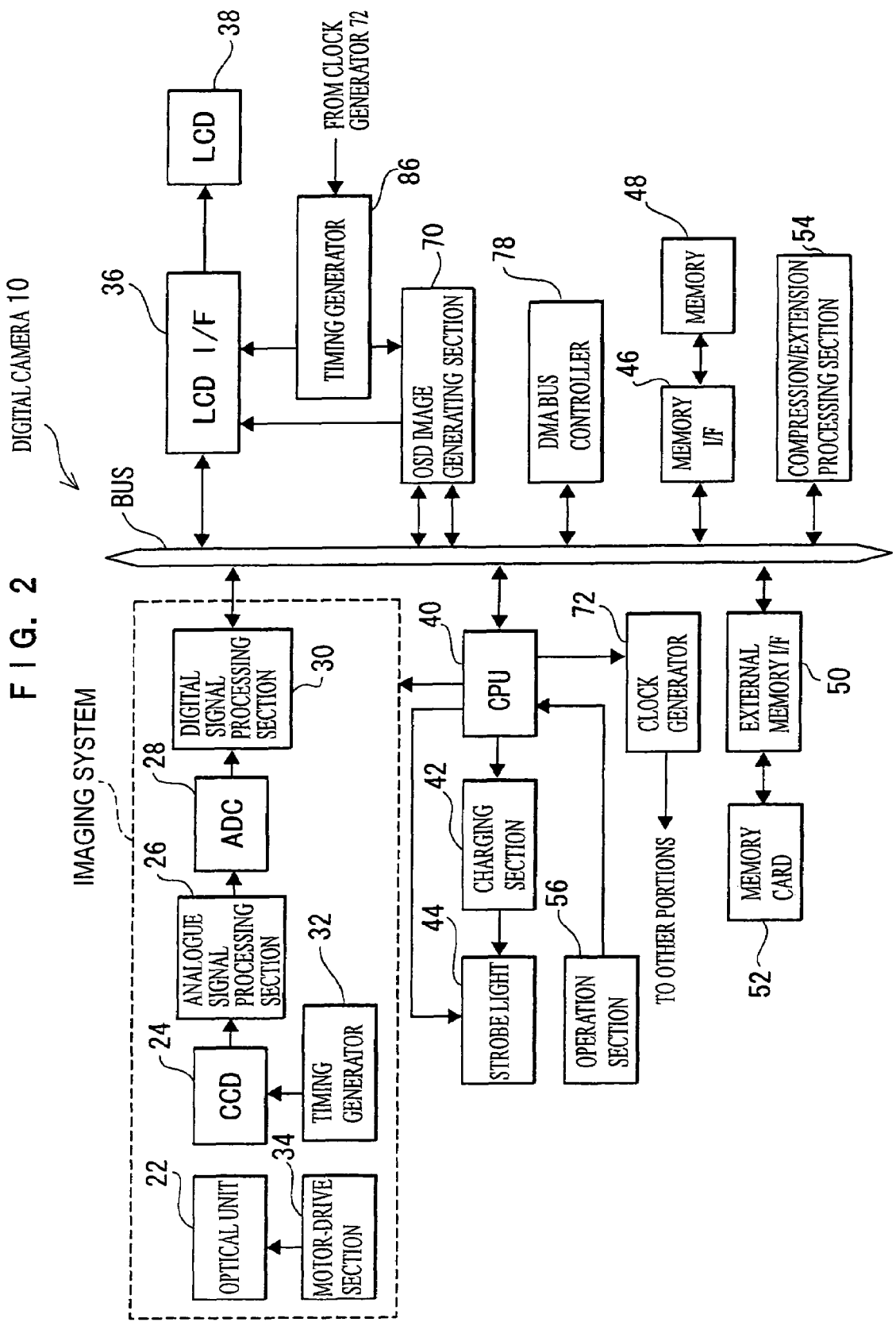
FIG. 2 is a block diagram showing a major electrical configuration of the digital camera according to the embodiment.

As shown in FIG. 2, the digital camera 10 has an optical unit 22 including the above-mentioned lens 21, a charged-coupled device (hereinafter referred to as "CCD") 24 disposed at a location rearward of the optical axis of lens 21, and an analogue signal processing section 26 for performing various analogue signal processing of input analogue signals.

Besides, the digital camera 10 includes an analogue/digital converter (hereinafter referred to as "ADC") 28 for converting an input analogue signal to a digital data, and a digital signal processing section 30 for performing various digital signal processing of input digital data.

Moreover, the digital signal processing section 30 has a built-in line buffer (not shown) having a predetermined capacity, and hence causes the input digital data to be directly stored in a memory 48, described hereinafter, at its predetermined region.

An output terminal of the CCD 24 is connected to an input terminal of the analogue signal processing section 26, an output terminal of the analogue signal processing section 26 is connected to an input terminal of the ADC 28, and an output terminal of the ADC 28 is connected to an input terminal of the digital signal processing section 30, respectively. Accordingly, the analogue signal representing the object image output from the CCD 24 is subjected to a predetermined analogue signal processing by the analogue signal processing section 26, and then converted to the digital image data by the ADC 28, thereafter input to the digital signal processing section 30.

Further, the digital camera 10 includes a CPU 40 for controlling the whole operation of the digital camera 10, a memory 48, configured by an SDRAM, for storing a predetermined information including a main image data obtained by photographing, a sub-image data representing character, and various kinds of parameters etc., and a memory interface 46 for controlling an access to the memory 48. The character represented by the sub-image data includes, for example, characters representing an image file name, a file capacity, photographing date and time, and a histogram.

Moreover, the digital camera 10 includes an external memory interface 50 which allows the digital camera 10 to access a memory card 52 configured by a portable Smart Media (Registered Trademark), and a compression/extension processing section 54 for executing a compressing processing and an extending processing to the digital image data.

On the contrary, the digital camera 10 mainly includes a timing generator 32 for generating a timing signal used for driving the CCD 24, and supplying it to the CCD 24. The drive of the CCD 24 is controlled by the CPU 40 through the timing generator 32.

Further, the digital camera 10 includes a motor driving section 34 for continuously changing a focal length of the lens 21.

Moreover, various kinds of switches including release switch 56A, the power supply switch 56B, the mode changing switch 56C, the cross-shaped cursor switch 56D, the menu switch, etc. (generically referred to as "operation section 56", in FIG. 2), all of which are described above, are connected to the CPU 40, and this CPU 40 always grasps the operation condition to the operation section 56.

Besides, the digital camera 10 includes a charging section 42 disposed between the strobe light 44 and the CPU 40 and charging an electric power for allowing the strobe light 44 to emit a light due to the control of the CPU 40. Further, the strobe light 44 also is connected to the CPU 40, and the light emission of the strobe light 44 is controlled by the CPU 40.

On the other hand, the digital camera 10 includes an LCD 38 for displaying an image, the LCD 38 has a plurality of pixel lines juxtaposed in a direction perpendicular to a main scanning direction, each of the pixel lines comprising a plurality of pixels arranged in the main scanning direction, and an LCD interface 36 for generating a display signal of allowing the LCD 38 to display a object image shown by an image data, a menu image, etc., and then for supplying the generated display signal to the LCD 38. Further, the digital camera 10 according to this embodiment has an OSD function of superposing, as needed, various kinds of characters as an image based on a sub-image data, on a object image as an image based on a main image data obtained by photographing, and then allows the LCD 38 to display them; and hence includes an OSD image generating section 70.

Further, the digital camera 10 includes a DMA bus controller 78 for carrying out a DMA (Direct Memory Access) transfer between the memory 48 and the OSD image generating section 70.

The digital camera 10 includes a timing generator 86 for generating a vertical synchronization signal and a horizontal synchronization signal. This timing generator 86 generates the vertical synchronization signal and the horizontal synchronization signal based on an operation clock signal input from a clock generator 72, and then supplies them to the OSD image generating section 70 and the LCD interface 36. Further, LCD interface 36 supplies the display signal in synchronization with the frequencies of the vertical synchronization signal and the horizontal synchronization signal generated from the timing generator 86, and then causes the LCD 38 to display the image.

The digital signal processing section 30, the LCD interface 36, the CPU 40, the OSD image generating section 70, the DMA bus controller 78, the memory interface 46, the external memory interface 50, and the compression/extension processing section 54 are connected to one another through a system bus BUS. The CPU 40 controls the operations of the digital signal processing section 30, the OSD image generating section 70, the LCD interface 36, and the compression/extension processing section 54, and accesses the memory 48 and the memory card 52 through the memory interface 46 or the external memory interface 50.

Next, a description will be given about a detail configuration of the OSD image generating section 70.

Figure 3:
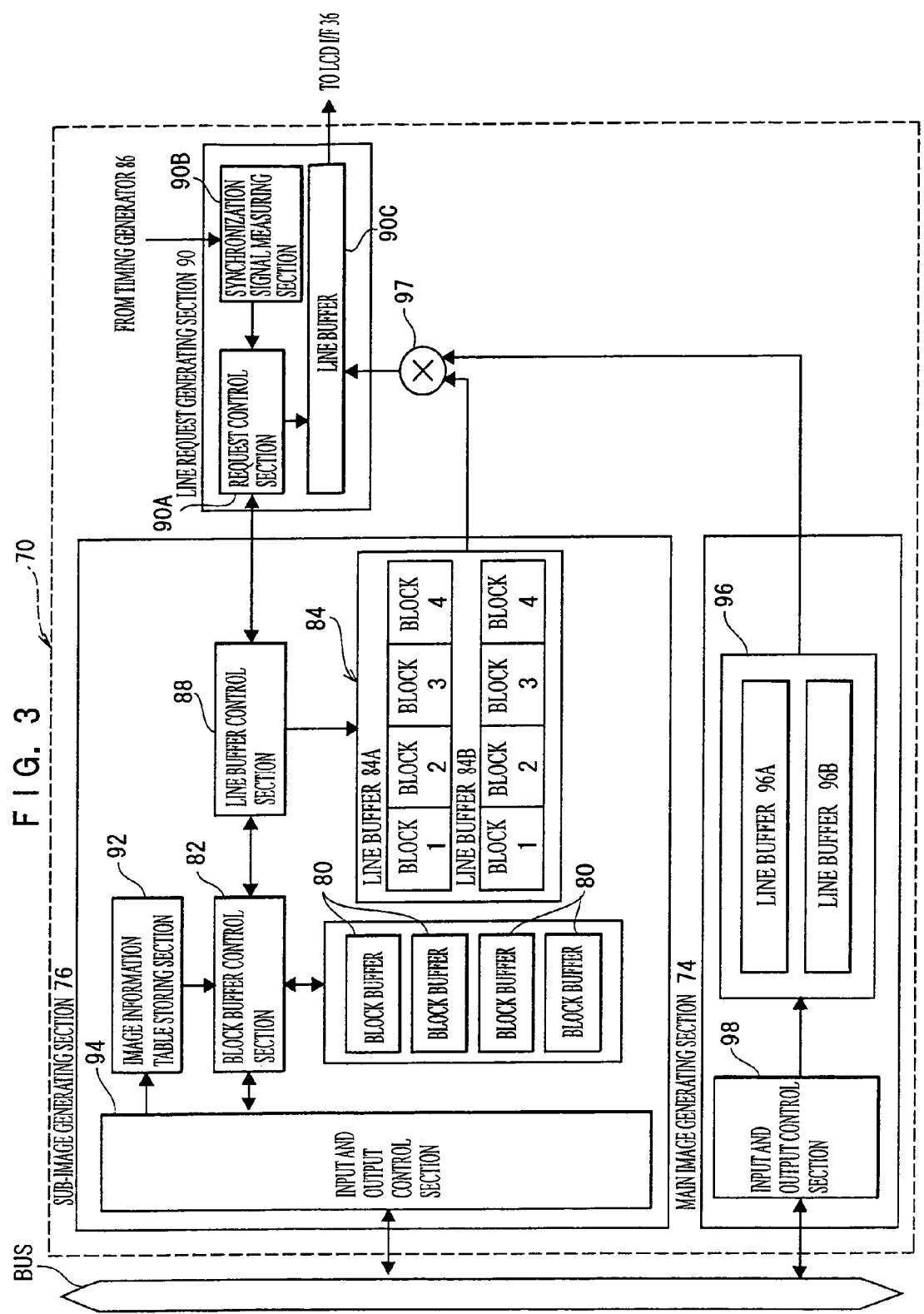
FIG. 3 is a block diagram showing a configuration of an OSD image generating section of the digital camera according to the embodiment.

As shown in FIG. 3, the OSD image generating section 70 is configured by a sub-image generating section 76 for compounding an image based on the plural sub-image data, a main image generating section 74, a compounding section 97 for compounding the sub-image data and the main image data, and a line request generating section 90 for requiring an image data to be displayed on a main scanning direction-wise pixel line of the LCD 38.

The sub-image generating section 76 includes four, e.g., block buffers 80, each of which stores data of such a block size when the main scanning direction-wise pixel line of the LCD 38 is divided into four blocks, a block buffer control section 82 for controlling the DMA bus controller 78 so as to DMA-transfer a predetermined data from the memory 48, controlling the block buffers 80 so as to store the data, and compounding the plural data stored in the block buffer 80, two line buffers 84A, 84B, each of which configured by the same size and number of blocks as the block buffers 80, and a line buffer control section 88 for controlling any one of the line buffers 84A, 84B so as to store the data compounded by the block buffer control section 82.

Further, between the block buffers 80 and the block buffer control section 82 is disposed, for example, a selector (not shown), of which selection signal allows the data to be stored any one of the block buffers 80. Also, between the line buffers 84A, 84B and the line buffer control section 88 is disposed, for example, a selector (not shown), of which selection signal allows the data transferred from the line buffer control section 88 to be stored in a predetermined block of any one of the line buffers 84A, 84B.

The sub-image generating section 76 further includes an image information table storing section 92 for storing an image information table ITABLE representing information related to the sub-image data, and an input and output control section 94 for controlling input and output of the data of the sub-image generating section 76. The image information table ITABLE includes, as shown in Table 1, a sub-image data file name, a sub-image data storing address, a sub-image data vertical size, a sub-image data transverse size, a sub-image data arrangement position (a horizontal coordinate, a vertical coordinate), and a sub-image data mixing ratio.

TABLE 1

Image Information Table

| Name of Item | Data |
|---|---|
| Image Data File Name | sub_image1.jpg |
| Image Data Storing Address | No. 65112 |
| Image Data Vertical Size | 50 |
| Image Data Transverse Size | 70 |
| Image Data Arrangement Position | (12, 30) |
| Image Data Mixing Ratio | 0.6 |

On this occasion, the unit of the size and the arrangement position (coordinate) of the sub-image data is a pixel. Also, the input and output control section 94 is connected to the system bus BUS; therefore, inputting a control signal to the DMA bus controller 78 causes the data input to or output from the sub-image generating section 76 to be DMA-transferred.

The main image generating section 74 includes two line buffers 96A, 96B, and an input and output control section 98 for controlling input and output of the main image data, and storing them at any one of the line buffers 96A, 96B. The input and output control section 98 is connected to the system bus BUS; therefore, inputting a control signal to the DMA bus controller 78 causes the data input to or output from the main image generating section 74 to be DMA-transferred.

The compound section 97 is connected to the line buffers 84 of the sub-image generating section 76 and the line buffers 96 of the main image generating section 74, and compounds the data of the line buffers 84 and the data of the line buffers 96 in timing with each other.

Further, the line request generating section 90 includes a synchronization signal measuring section 90B for measuring a horizontal synchronization signal and a vertical synchronization signal input from the timing generator 86, and judging which main scanning direction-wise pixel line the LCD 38 scans, a request control section 90A for requesting an image data to be displayed on a predetermined main scanning direction-wise pixel line, based on the result judged by the synchronization signal measuring section 90B, and a line buffer 90C for storing the image data to be displayed on the main scanning direction-wise pixel line of the LCD 38. The line request generating section 90 and the LCD interface 36 can be synchronized in driving timing with each other, both by using the vertical synchronization signal and the horizontal synchronization signal generated by the timing generator 86, in the same manner. Also, the synchronization signal measuring section 90B counts the input pulse number of the horizontal synchronization signals occurring after the vertical synchronization signal is input, and then judges the main scanning direction-wise pixel line scanned on the LCD 38, and counts the input pulse number of a driving clock after each of the horizontal synchronization signals is input, and then judges a scanning position on the pixel line of the LCD 38. The line buffer 90C is connected to the LCD interface 36, and outputs the image data stored in the line buffer 90C to the LCD interface 36, based on an output instructing signal from the request control section 90A.

Next, a description will be given about an OSD image displaying processing routine of the digital camera 10 according to the embodiment.

Figure 4:
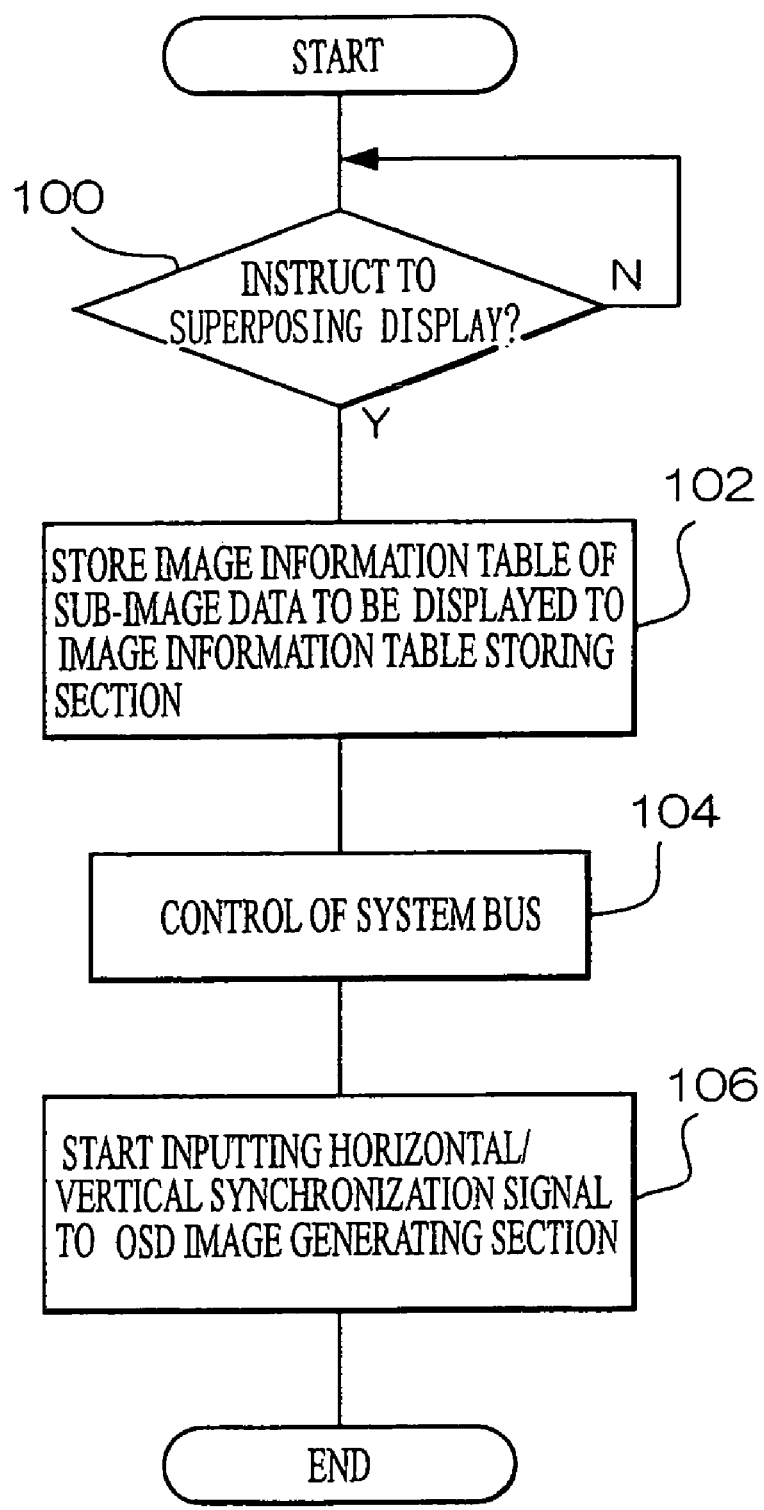
FIG. 4 is a flowchart showing a flow of an OSD image generating processing routine according to the embodiment.

When rotating the mode change-over switch 56C of the digital camera 10 to settle the playback mode, the LCD 38 displays an image based on the main image data obtained by photographing, followed by the CPU 40 executing an OSD image displaying processing routine shown by FIG. 4, described below.

In the step 100, it is determined whether or not the operation section 56 instructs to superpose and display an image based on the sub-image data representing a character. For example, when pressing the menu switch to display a menu screen, that is, the above-mentioned determination is affirmative, the program proceeds to the step 102.

In the step 102, all of the image information table ITABLE of the sub-image data superposed and displayed due to the instruction of the step 100 is read out from the memory 48, and then stored in the image information table storing section 92. And, in the step 104, the system bus is controlled so as to be usable for the purpose of data-transferring among the memory 48, the OSD image generating section 70, and the LCD interface 36 in the OSD image generating processing, and then in the step 106, the vertical synchronization signal and the horizontal synchronization signal of the timing generator 86 starts being input to the OSD image generating section 70, followed by terminating the OSD image displaying processing routine.

Figure 5:
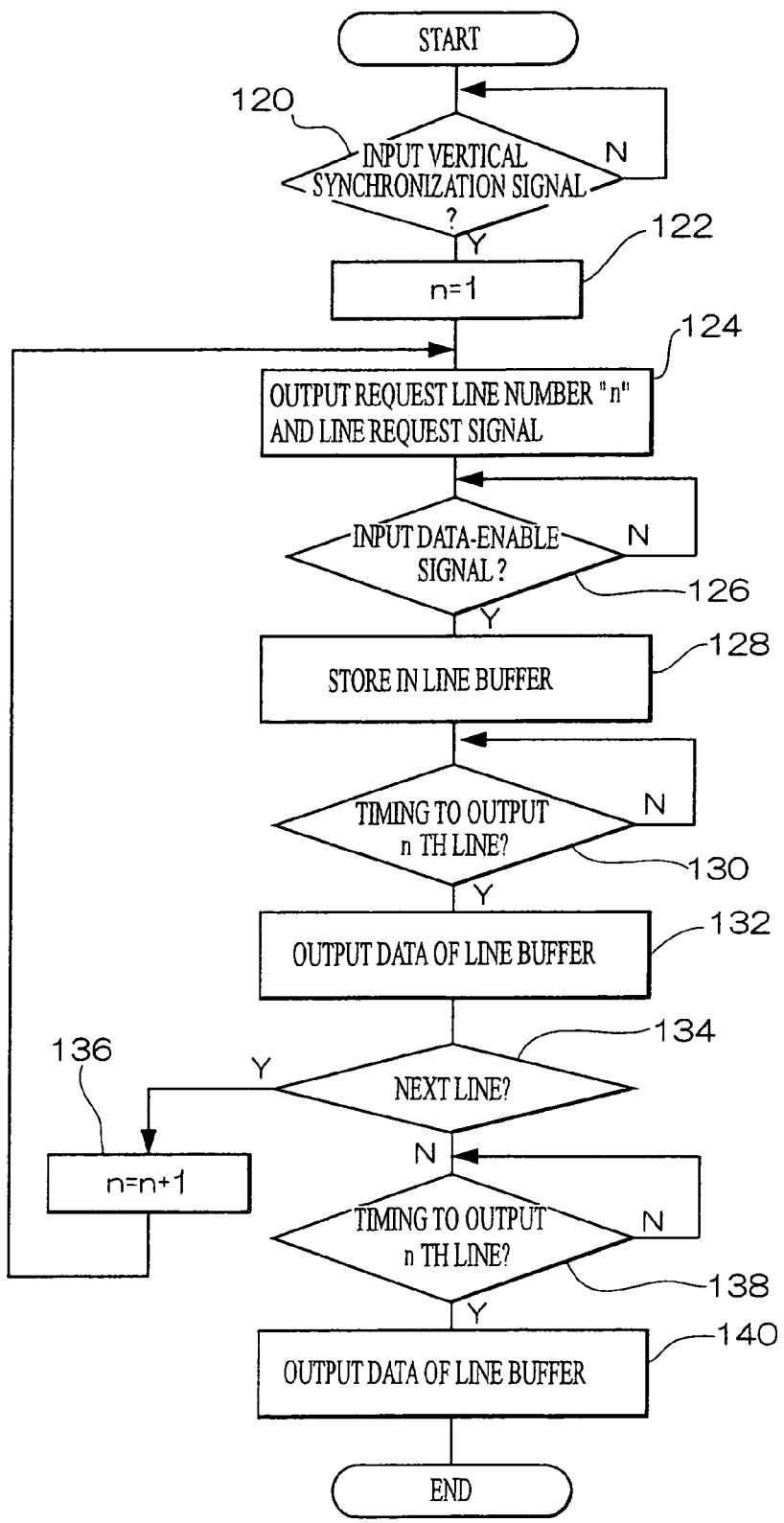
FIG. 5 is a flowchart showing a flow of a line data requiring processing routine according to the embodiment.

Next, the line request generating section 90 executes a line data requesting processing routine shown in FIG. 5. At first, in the step 120, the synchronization signal measuring section 90B determines whether or not pulses of the vertical synchronization signal is input from the timing generator 86. If the pulses are input, that is, the determination of the step 120 is affirmative, the request control section 90A outputs to the line buffer control section 88 a signal representing a request line number "1" specifying the main scanning direction-wise pixel line, and a line request signal.

Figure 6:
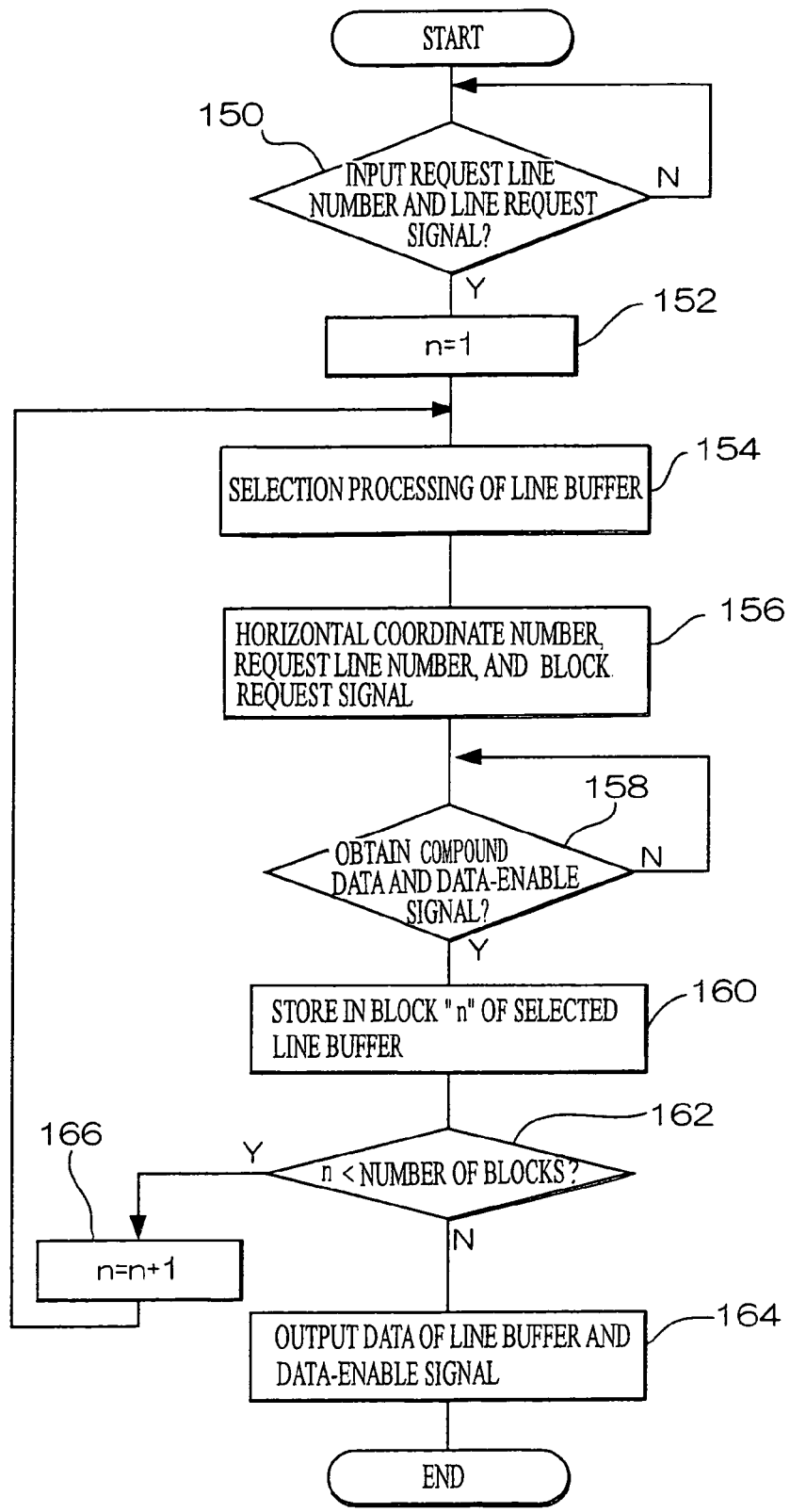
FIG. 6 is a flowchart showing a flow of a line data generating processing routine according to the embodiment.

Next, the line buffer control section 88 executes a line data generating processing routine shown in FIG. 6. At first, in the step 150, it is determined whether or not the signal representing the request line number and the line request signal are input from the request control section 90A. If their signals are input, that is, the determination of the step 150 is affirmative, any one of the line buffers 84A, 84B is selected as a line buffer for storing the data in the step 154. For example, the data is selected so as to be stored in the line buffers 84A or 84B alternately whenever the line data generating processing routine is executed, and then the selected signal is input to the line buffers 84. Then, in the step 156, a horizontal coordinate signal representing a horizontal coordinate of a start pixel in the block of the pixel line, a signal representing a request line number, and a block request signal are output to the bock buffer control section 82.

Figure 7:
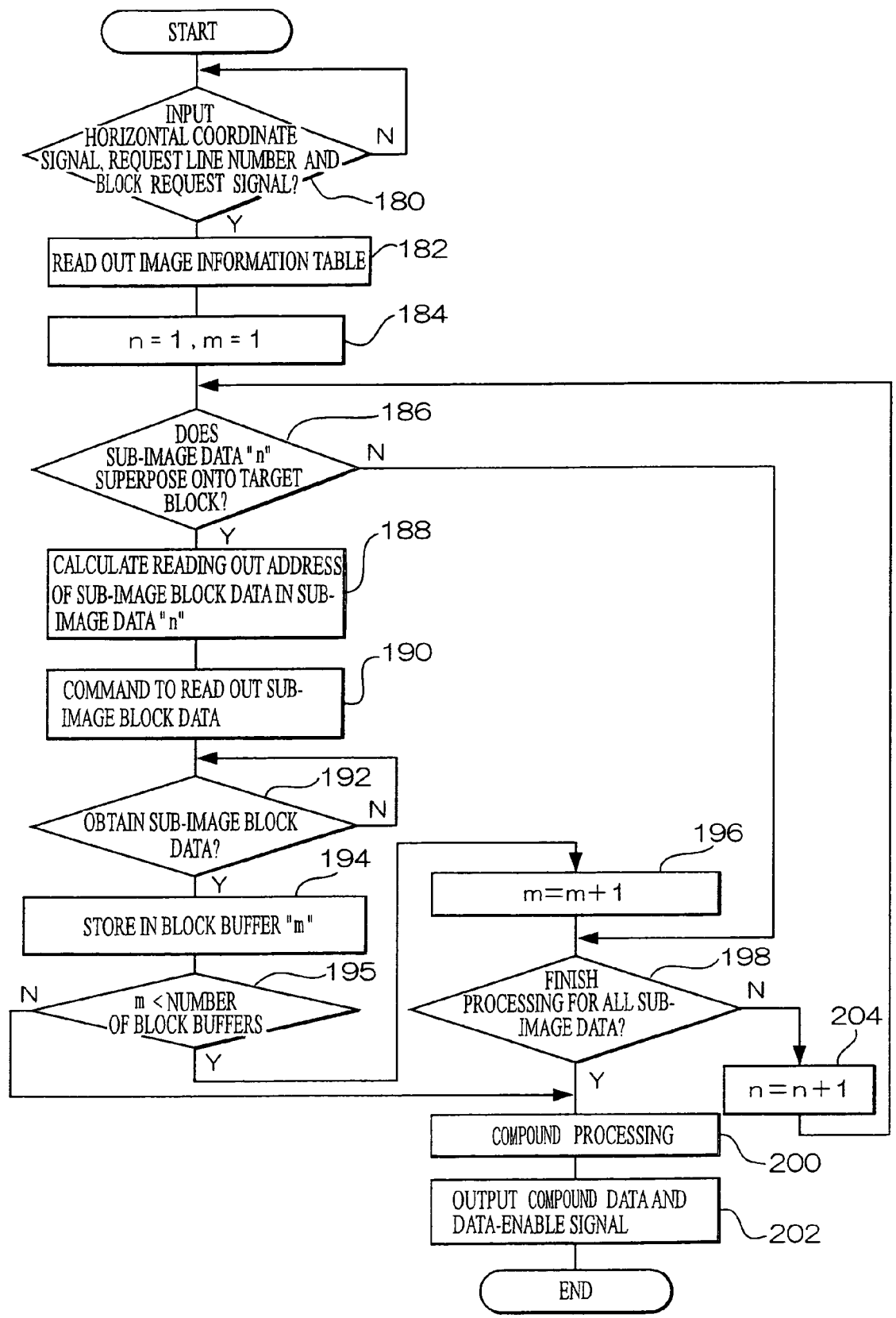
FIG. 7 is a flowchart showing a flow of a compound sub-image block data generating processing routine according to the embodiment.

Next, the block buffer control section 82 executes a compound sub-image block data generating processing routine shown in FIG. 7. At first, in the step 180, it is determined whether or not the horizontal coordinate signal, the signal representing the request line number, and the block request signal are input. If their signals are input, that is, the determination of the step 180 is affirmative, all the image information tables ITABLE is read out from the image information table storing section 92 in the step 182. Then, in the step 186, the sub-image data is subjected to a superposition determining processing based on the size and the arrangement position in the first image information table ITABLE.

Figure 8:
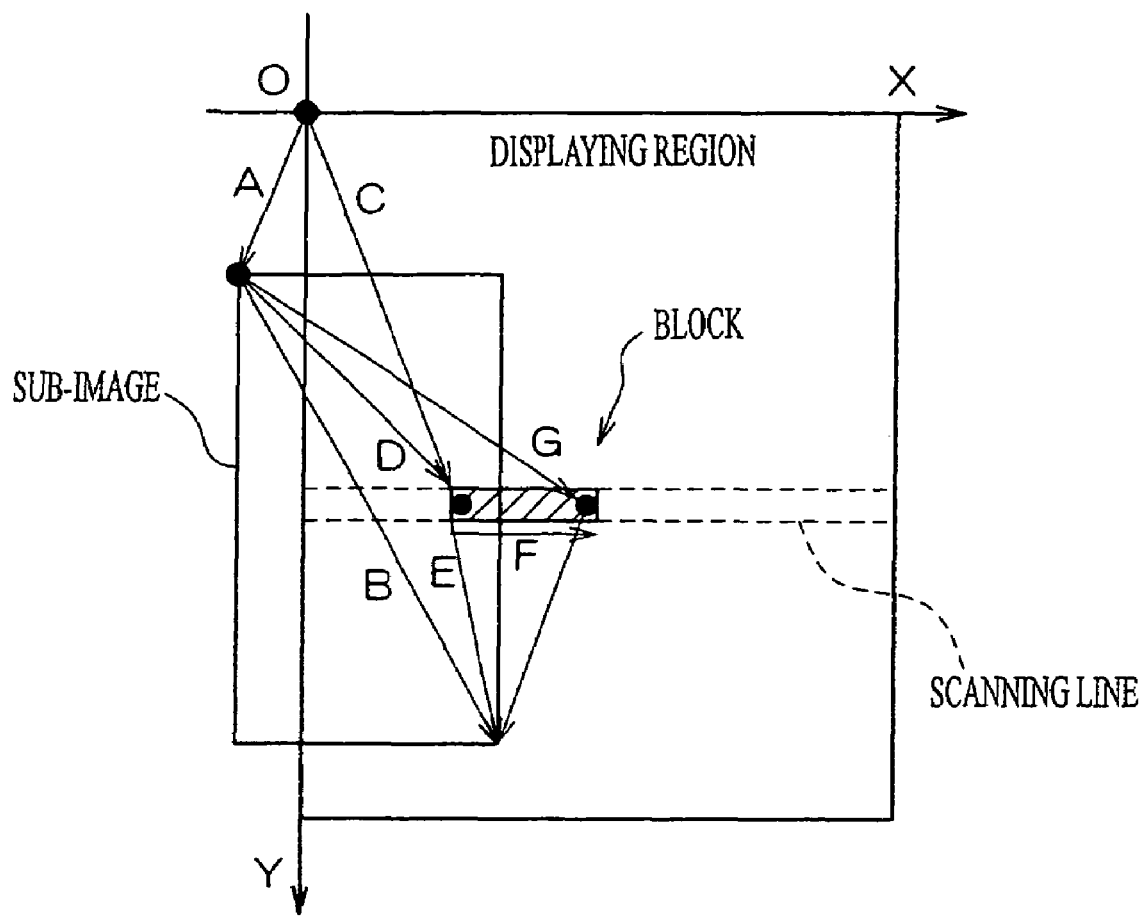
FIG. 8 is a conceptual view showing two-dimensional vectors on a main image in a superposition judging processing according to the embodiment.

In the superposition determining processing, as shown in FIG. 8, when A designates a two-dimensional vector (a horizontal coordinate, a vertical coordinate) representing a coordinate of the sub-image data arrangement position; B, a two-dimensional vector (a width, a height) representing a size of the sub-image data; C, a two-dimensional vector (a horizontal coordinate, a vertical coordinate) representing a block head coordinate; and F, a two-dimensional vector (a block buffer size: 0) representing a block size, two-dimensional vectors D, E, and G are calculated by the use of the following equations:

$$D = C - A$$

$$E = B - C + A$$

$$G = C - A + F$$

On this occasion, when a horizontal coordinate component of the vector D is represented by Dx, and a vertical coordinate component of the vector D is represented by Dy, the superposition determining processing is executed by the use of the logical formula.

$$\text{NOT}\{(Dy \leq 0) \cup (Ey \leq 0) \cup (Ex \leq 0) \cup (Gx \leq 0)\}$$

If this determination equation is affirmative, it is determined that the target block of the pixel line and the sub-image data are superposed, followed by proceeding to the step 188, whereas if the determination equation is negative, it is determined that superposition on the target block is not realized, followed by proceeding to the step 198.

In the step 188, a reading out address of the sub-image data in the first image information table ITABLE is calculated by the use of the following equation.

Reading out address = Sub-image data storing address + $(Bx \times Dy + Dx) \times$ data amount per one pixel Next, in the step 190, a reading out command signal is output from the reading out address calculated using the above equation, to the DMA bus controller 78 through the input and output control section 94, so as to read out the sub-image block data SBDATA which is equivalent to the block buffer size out of the first sub-image data. Then, in the step 192, it is determined whether or not the sub-image block data SBDATA is obtained from the memory 48. If the data is obtained, that is, the determination of the step 192 is affirmative, the obtained sub-image block data SBDATA is stored into the first block buffer 80 in the step 194. On this occasion, when the target block and the sub-image data are superimposed partially, "a transparent data" is stored in a region corresponding to a non-superimposed region of the block buffer 80.

Then, in the step 195, it is determined whether or not any one of the block buffers 80 does not store the sub-image block data SBDATA. If all the block buffers 80 already have stored the data, that is, the determination of the step 195 is negative, the program proceeding to the step 200, whereas if any one of the block buffers 80 does not store the data, that is, the determination of the step 195 is affirmative, it is determined in the step 198 whether or not the above-mentioned processing is finished for the sub-image data of all the image information tables ITABLE read out in the step 182. If any one of the sub-image data is unprocessed, that is, the determination of the step 198 is negative, the program returning to the step 186, followed by repeatedly executing the afore-mentioned steps 186 to 198 for the second or later sub-image data. When the above-mentioned processing has been finished for the sub-image data of all the read out image-information tables ITABLE, that is, the determination of the step 198 is affirmative, the plural sub-image block data SBDATA stored in the block buffer 80 are compounded in the step 200. On this occasion, the compounding is carried out with reference to the mixing ratio stored in the image information table ITABLE. Moreover, the compounding processing is executed by using the conventional technique, a description of which, therefore, is omitted.

Then, the compound sub-image block data MSBDATA generated in the step 200 and the data-enable signal are output to the line buffer control section 88, followed by terminating the compound sub-image block data generating processing routine.

Next, in the line data generating processing routine of the step 158 shown in FIG. 6, the line buffer control section 88 determines whether or not the compound sub-image block data MSBDATA and the data-enable signal are input from the block buffer control section 82. If these data is input, that is, the determination of the step 158 is affirmative, the program proceeds to the step 160, in which the compound sub-image block data MSBDATA is stored in the first block in the line buffer 84 selected in the step 154. In the next step 162, it is determined whether or not there is the next block of the line buffer 84. If the number of the target block is smaller than the number of the blocks of the line buffer 84, that is, the determination of the step 162 is affirmative, the processing of the above-mentioned steps 156 to 162 are repeatedly executed for the next block. Thereafter, all the blocks have been subjected to the above-mentioned processing, that is, the determination of the step 162 is negative, the program proceeds to the step 164, in which the data-enable signal is output to the request control section 90A of the line request generating section 90, and then a sub-image line data SLDATA including the plural compound sub-image block data MSBDATA stored in the line buffer 84 selected in the step 154, according to a signal of instructing the transfer from the request control section 90A, transferred to the compound section 97, followed by terminating the line data generating processing routine.

Next, in the line data requesting processing routine of the step 126 shown in FIG. 5, the line request generating section 90 determines whether or not the data-enable signal is input from the line buffer control section 88. If the data-enable signal is input, that is, the determination of the step 126 is affirmative, a signal is output, in the step 128, of instructing to the line buffer controls section 88 so as to transfer the sub-image line data SLDATA to the compound section 97, and then a superposed image line data obtained by compounding the sub-image line data SLDATA and the main image line data compounded by section 97 is stored in the line buffer 90C.

In the next step 130, the synchronizing signal measuring section 90B determines whether or not it is a time to output, to the LCD interface 36, the superposed image line data to be displayed on the first pixel line. If the pixel line main-scanned by the LCD 38 is determined to be the first line based on the horizontal synchronization signal from the timing generator 86, that is, the determination of the step 130 is affirmative, the superposed image line data stored in the line buffer 90C is output to the LCD interface 36 in the step 132.

In the next step 134, it is determined whether or not there is the next pixel line. If all the pixel lines has not been subjected to the above-mentioned processing, the program returns to the step 124, in which the next pixel line is subjected to processing of requesting the line data, followed by repeatedly executing the processing of the steps 124 to 134. When all the pixel lines are subjected to the above-mentioned processing, that is, the determination of the step 134 is affirmative, it is determined in the step 138 whether or not it is a time to output the superposed image line data of the endmost pixel line to the LCD interface 36. If the determination is affirmative, the program proceeds to the step 140, the compound image line data stored in the line buffer 90C is output to the LCD interface 36, followed by terminating the line data requesting processing routine.

Then, the LCD interface 36 outputs a display signal of the superposed image line data to the LCD 38, in synchronization with the horizontal synchronization signal from the timing generator 86. This display signal of the superposed image line data is output in each pixel line, and then a superposed image obtained by superposing the image based on the sub-image data on the image based on the main image data is displayed on the LCD 38.

As described above, since a part of the plural sub-image data displayed in each block of a plurality of blocks into which the pixel line of the LCD is divided is stored in the plural block buffers, and then the stored part of a plurality of the sub-image data is compounded, it is possible to eliminate the need for the frame memory, which makes the configuration at a low cost and enables an image to be displayed with a plurality of sub-image data superposed. Further, by executing the OSD image generating processing by means of the OSD image generating section and the DMA bus controller, it is possible to decrease CPU load.

Moreover, the above-mentioned embodiment is exemplified by a case in which the main scanning direction-wise pixel line of the LCD is divided into four blocks; however, the division number of the pixel line is not limited to four, but any other number may be employed. In this case, the number of blocks of the line buffers is made identical to the divisional number of the pixel line.

Further, the above-mentioned embodiment is exemplified by a case in which the number of the block buffers is four, but not limited thereto. Two or more block buffers may suffice.

Further, the above-mentioned embodiment is exemplified by a case in which the number of the line buffers, which is controlled by the line buffer control section, is two, but not limited thereto. A single line buffer may suffice, or three or more line buffers may suffice.

This embodiment is exemplified by a case in which the image information table includes the image data mixing ratio, and the sub-image block data is compounded based on the image data mixing ratio when compounding the sub-image data; however, it is recommended that the image information table includes the image data priority, and hence the superposition may be executed by overwriting with the sub-image block data of high priority.

A first aspect of the invention provides a display apparatus comprising a storing section that stores a plurality of sub-image data, a display section that displays an image, and that comprises a plurality pixel lines juxtaposed in a direction perpendicular to a predetermined direction, each of the pixel lines comprising a plurality of pixels arranged in the predetermined direction, a determining section that determines whether or not a part of the sub-image data is displayed in each block of a plurality of blocks into which the pixel line is divided, when the display section displays the sub-image data, a plurality of block storing sections, each of which stores the part of the sub-image data displayed on the block, a reading out section that reads out the part of the sub-image data displayed on the block from a storing section, and then causes any one of a plurality of the block storing sections to store the read out part of the sub-image data, when the determining section determines that the part of the sub-image data is displayed, a generating section that generates compound sub-image part data obtained by compounding the parts of the respective sub-image data stored in the block storing sections, respectively, when all the parts of the sub-image data, which are determined to be displayed, are stored in a plurality of the block storing sections by the reading out section, for one block of a plurality of the divided blocks, and a superposing and outputting section that generates superposed image data obtained by superposing the compound sub-image part data corresponding to each of the blocks of the pixel line, respectively, on the main image data corresponding to the pixel line, and then outputs the generated superposed image data on the displaying section.

According to the first aspect of the present invention, a determining section determines whether or not a part of the sub-image data is displayed in each block of the plural blocks into which the pixel line is divided, when the displaying section displays the sub-image data, a reading out section reads out the part of the sub-image data displayed on the block from the storing section, and then causes any one of the plural block storing sections to store the read out part of the sub-image data, when the determining section determines that the part of the sub-image data is displayed, a generating section generates a compound sub-image part data obtained by compounding the parts of the respective sub-image data stored in the block storing sections, respectively, when all the parts of the sub-image data, which are determined to be displayed, are stored in the plural block storing sections by the reading out section, for one block of the plural divided blocks, and a superposing output section generates a superposed image data obtained by superposing the compound sub-image part data corresponding to each of the blocks of the pixel line, respectively, on the main image data corresponding to the pixel line, and then outputs the generated superposed image data on the displaying section.

In the first aspect of the invention, since a part of the plural sub-image data displayed in each block of the pixel line of the display section is stored in the plural block storing sections, and then the stored part of the plural sub-image data are compounded, it is possible to make the configuration at a low cost and enables an image to be displayed with the plural sub-image data superposed.

Further, the first aspect of the invention may further comprise a line storing section that stores data stored in the block storing sections which are identical in number with the blocks, a storing control section that causes the line storing section to store the compound sub-image part data when the compound sub-image part data is generated, a transmitting section that transmits a reference signal used for displaying an image on the displaying section, and a line outputting section that outputs the compound sub-image part data stored in the line storing section corresponding to each of the blocks of the pixel line, respectively, to the superposing and outputting section, in synchronization with the reference signal transmitted from the transmitting section, after each of the compound sub-image part data has been stored in the line storing section by the storing control section for all the blocks of one of the pixel lines.

According the above configuration, when the compound sub-image part data is generated by the generating section, a storing control section causes the line storing section to store the compound sub-image part data, and a line outputting section can output the compound sub-image part data stored in the line storing section corresponding to each of the blocks of the pixel line, respectively, to the superposing outputting section, in synchronization with the reference signal transmitted from the transmitting section, after each of the compound sub-image part data has been stored in the line storing section by the storing control section for all the blocks of one of the pixel lines.

According the above configuration, since a part of the plural sub-image data displayed in each block of the plural blocks into which the pixel line of the display section is divided is stored in the plural block storing sections, and then the stored part of a plurality of the sub-image data is compounded. There can be obtained an advantageous effect that it is possible to eliminate the need for the frame memory, which makes the configuration at a low cost and enables an image to be displayed with the plural sub-image data superposed.

Further, in the first aspect of the invention, each of the sub-image data stored in the storing section may comprise an image information table including, with respect to the sub-image, at least one of an image data file name, an image data storing address, an image data vertical size, an image data transverse size, an image data arrangement position, an image data mixing ratio, and a priority.

In the first aspect of the invention, the sub-image data may include the sub-image data size and the sub-image data arrangement position with respect to the sub-image, and the determining section determines whether or not the sub-image data superposes in the arrangement position of the respective blocks based on the sub-image data size and the sub-image data arrangement position.

In the first aspect of the invention, the sub-image data may include the image data mixing ratio with respect to the sub-image, and the generating section generates the compound sub-image part data based on the mixing ratio of each of the sub-image data.

In the first aspect of the invention, the sub-image data may include the image data priority with respect to the sub-image, and the generating section generates the compound sub-image part data by overwriting with the sub-image data of high priority based on the priority of each of the sub-image data.

The first aspect of the invention, may further comprise a line storing section that stores the main image data for each line, and the superposing and outputting section superposes the compound sub-image part data on the main image data stored in the line storing section.

The first aspect of the invention may further comprise a transmitting section that transmits a reference signal for synchronizing the superposing and outputting section and the displaying section, and the superposing outputting section outputs the superposed image data to the display section based on the reference signal transmitted from the transmitting section.

In a second aspect of the invention, there is provided a display method of a display apparatus that displays a plurality of sub-images together with a main image, comprising the steps of: obtaining main image data and a plurality of sub-image data, storing the main data and the plurality of sub-image data, both of which are to be displayed, determining whether or not a part of the sub-image data is displayed in each block of a plurality of blocks into which a pixel line comprising a plurality of pixels arranged in a predetermined direction is divided, when displaying the sub-image data, reading out the part of the sub-image data displayed on the block, and then storing the read out part of the sub-image data, individually, when it is determined that the part of the sub-image data is displayed, generating compound sub-image part data obtained by compounding all the parts of the respective sub-image data stored, individually, when all the parts of the sub-image data, which are determined to be displayed, are stored, for one block of a plurality of the divided blocks, and generating superposed image data obtained by superposing the compound sub-image part data corresponding to each of the blocks of the pixel line, respectively, on the main image data corresponding to the pixel line, and then displaying the generated superposed image data.

The second aspect of the invention may further comprise the steps of when the compound sub-image part data is generated, storing the compound sub-image part data for all the blocks of one of the pixel lines, and then outputting the compound sub-image part data corresponding to each of the blocks of the pixel line, respectively, in synchronization with a reference signal transmitted in order to display an image.

In the second aspect of the invention, each of the sub-image data stored in the storing step may comprise an image information table including, with respect to the sub-image, at least one of an image data file name, an image data storing address, an image data vertical size, an image data transverse size, an image data arrangement position, an image data mixing ratio, and a priority.

In the second aspect of the invention, the sub-image data may include the sub-image data size and the sub-image data arrangement position with respect to the sub-image, and the determining step comprises determining whether or not the sub-image data superposes in the arrangement position of the respective blocks based on the sub-image data size and the sub-image data arrangement position.

According to the second aspect of the invention, the sub-image data may include the image data mixing ratio with respect to the sub-image, and the generating step comprises generating the compound sub-image part data based on the mixing ratio of each of the sub-image data.

According to the second aspect of the invention, the sub-image data may include the image data priority with respect to the sub-image, and the generating step comprises generating the compound sub-image part data by overwriting with the sub-image data of high priority based on the priority of each of the sub-image data.

The second aspect of the invention may further comprise the steps of storing the main image data for each line, and superposing the compound sub-image part data on the main image data stored for each line.

The second aspect of the invention may further comprise a transmitting step of transmitting a reference signal for synchronizing the generating and the displaying, wherein the generating step comprises outputting the superposed image data based on the transmitted reference signal.

According to a third aspect of the invention, there is provided a digital camera having a display apparatus comprising a storing section that stores a plurality of sub-image data, a display section that displays an image, and that comprises a plurality pixel lines juxtaposed in a direction perpendicular to a predetermined direction, each of the pixel lines comprising a plurality of pixels arranged in the predetermined direction, a determining section that determines whether or not a part of the sub-image data is displayed in each block of a plurality of blocks into which the pixel line is divided, when the display section displays the sub-image data, a plurality of block storing sections, each of which stores the part of the sub-image data displayed on the block, a reading out section that reads out the part of the sub-image data displayed on the block from a storing section, and then causes any one of a plurality of the block storing sections to store the read out part of the sub-image data, when the determining section determines that the part of the sub-image data is displayed, a generating section that generates compound sub-image part data obtained by compounding the parts of the respective sub-image data stored in the block storing sections, respectively, when all the parts of the sub-image data, which are determined to be displayed, are stored in a plurality of the block storing sections by the reading out section, for one block of a plurality of the divided blocks, and a superposing and outputting section that generates superposed image data obtained by superposing the compound sub-image part data corresponding to each of the blocks of the pixel line, respectively, on the main image data corresponding to the pixel line, and then outputs the generated superposed image data on the displaying section.

Further, the third aspect of the invention may further comprise a line storing section that stores data stored in the block storing sections which are identical in number with the blocks, a storing control section that causes the line storing section to store the compound sub-image part data when the compound sub-image part data is generated, a transmitting section that transmits a reference signal used for displaying an image on the displaying section, and a line outputting section that outputs the compound sub-image part data stored in the line storing section corresponding to each of the blocks of the pixel line, respectively, to the superposing and outputting section, in synchronization with the reference signal transmitted from the transmitting section, after each of the compound sub-image part data has been stored in the line storing section by control of the storing control section for all the blocks of one of the pixel lines.

In the third aspect of the invention, each of the sub-image data stored in the storing section may comprise an image information table including, with respect to the sub-image, at least one of an image data file name, an image data storing address, an image data vertical size, an image data transverse size, an image data arrangement position, an image data mixing ratio, and a priority.

In the third aspect of the invention, the sub-image data may include the sub-image data size and the sub-image data arrangement position with respect to the sub-image, and the determining section determines whether or not the sub-image data superposes in the arrangement position of the respective blocks based on the sub-image data size and the sub-image data arrangement position.

What is claimed is:

1. A display apparatus comprising:
a storing section that stores a plurality of sub-image data;
a display section that displays an image, and that comprises a plurality of pixel lines juxtaposed in a direction perpendicular to a predetermined direction, each of said pixel lines comprising a plurality of pixels arranged in said predetermined direction;
an on-screen image generating section which is a portion of the display section and includes a plurality of blocks;
a determining section that determines whether or not a part of said sub-image data is displayed in each block of the plurality of blocks into which said pixel line is divided, when said display section displays said sub-image data;
a plurality of block storing sections, each of which stores said part of said sub-image data displayed on said block;
a reading out section that reads out said part of said sub-image data displayed on said block from a storing section, and then causes any one of a plurality of said block storing sections to store said read out part of said sub-image data, when said determining section determines that said part of said sub-image data is displayed;
a generating section that generates compound sub-image part data obtained by compounding said parts of said respective sub-image data stored in said block storing sections, respectively, when all said parts of said sub-image data, which are determined to be displayed, are stored in a plurality of said block storing sections by said reading out section, for one block of a plurality of said divided blocks; and
a superposing and outputting section that generates superposed image data obtained by superposing said compound sub-image part data corresponding to each of said blocks of said pixel line, respectively, on said main image data corresponding to said pixel line, and then outputs said generated superposed image data on said displaying section.

2. The display apparatus as claimed in claim 1, further comprising:
a line storing section that stores data stored in said block storing sections which are identical in number with said blocks;
a storing control section that causes said line storing section to store said compound sub-image part data when said compound sub-image part data is generated;
a transmitting section that transmits a reference signal used for displaying an image on said displaying section; and
a line outputting section that outputs said compound sub-image part data stored in said line storing section corresponding to each of said blocks of said pixel line, respectively, to said superposing and outputting section, in synchronization with said reference signal transmitted from said transmitting section, after each of said compound sub-image part data has been stored in said line storing section by said storing control section for all said blocks of one of said pixel lines.

3. The display apparatus as claimed in claim 1, wherein each of said sub-image data stored in said storing section comprises an image information table including, with respect to a sub-image, at least one of an image data file name, an image data storing address, an image data vertical size, an image data transverse size, an image data arrangement position, an image data mixing ratio, and a priority.

4. The display apparatus as claimed in claim 1, wherein said sub-image data includes said sub-image data size and said sub-image data arrangement position with respect to a sub-image, and said determining section determines whether or not said sub-image data superposes in said arrangement position of said respective blocks based on said sub-image data size and said sub-image data arrangement position.

5. The display apparatus as claimed in claim 1, wherein said sub-image data includes said image data mixing ratio with respect to a sub-image, and said generating section generates said compound sub-image part data based on said mixing ratio of each of said sub-image data.

6. The display apparatus as claimed in claim 1, wherein said sub-image data includes said image data priority with respect to a sub-image, and said generating section generates said compound sub-image part data by overwriting with said sub-image data of high priority based on said priority of each of said sub-image data.

7. The display apparatus as claimed in claim 1, further comprising a line storing section that stores said main image data for each line, and said superposing and outputting section superposes said compound sub-image part data on said main image data stored in said line storing section.

8. The display apparatus as claimed in claim 1, further comprising a transmitting section that transmits a reference signal for synchronizing said superposing and outputting section and said displaying section, and said superposing outputting section outputs said superposed image data to said display section based on said reference signal transmitted from said transmitting section.

9. A display method of a display apparatus that displays a plurality of sub-images together with a main image, comprising the steps of:
providing a display apparatus comprising an on-screen image generating section which is a portion of a display section and includes a plurality of blocks;
obtaining main image data and a plurality of sub-image data;
storing said main data and said plurality of sub-image data, both of which are to be displayed;
determining whether or not a part of said sub-image data is displayed in each block of the plurality of blocks into which a pixel line comprising a plurality of pixels arranged in a predetermined direction is divided, when displaying said sub-image data;
reading out said part of said sub-image data displayed on said block, and then storing said read Out part of said sub-image data, individually, when it is determined that said part of said sub-image data is displayed;
generating compound sub-image part data obtained by compounding all said parts of said respective sub-image data stored, individually, when all said parts of said sub-image data, which are determined to be displayed, are stored, for one block of a plurality of said divided blocks; and
generating superposed image data obtained by superposing said compound sub-image part data corresponding to each of said blocks of said pixel line, respectively, on said main image data corresponding to said pixel line, and then displaying said generated superposed image data.

10. The method of claim 9, further comprising the steps of:
when said compound sub-image part data is generated, storing said compound sub-image part data for all said blocks of one of said pixel lines, and then outputting said compound sub-image part data corresponding to each of said blocks of said pixel line, respectively, in synchronization with a reference signal transmitted in order to display an image.

11. The method of claim 9, wherein each of said sub-image data stored in said storing step comprises an image information table including, with respect to said sub-image, at least one of an image data file name, an image data storing address, an image data vertical size, an image data transverse size, an image data arrangement position, an image data mixing ratio, and a priority.

12. The method of claim 9, wherein said sub-image data includes said sub-image data size and said sub-image data arrangement position with respect to said sub-image, and said determining step comprises determining whether or not said sub-image data superposes in said arrangement position of said respective blocks based on said sub-image data size and said sub-image data arrangement position.

13. The method of claim 9, wherein said sub-image data includes said image data mixing ratio with respect to said sub-image, and said generating step comprises generating said compound sub-image part data based on said mixing ratio of each of said sub-image data.

14. The method of claim 9, wherein said sub-image data includes said image data priority with respect to said sub-image, and said generating step comprises generating said compound sub-image part data by overwriting with said sub-image data of high priority based on said priority of each of said sub-image data.

15. The method of claim 9, further comprising the steps of storing said main image data for each line, and superposing said compound sub-image part data on said main image data stored for each line.

16. The method of claim 9, further comprising a transmitting step of transmitting a reference signal for synchronizing said generating and said displaying, wherein said generating step comprises outputting said superposed image data based on said transmitted reference signal.

17. A digital camera having a display apparatus comprising:
   a storing section that stores a plurality of sub-image data;
   a display section that displays an image, and that comprises a plurality pixel lines juxtaposed in a direction perpendicular to a predetermined direction, each of said pixel lines comprising a plurality of pixels arranged in said predetermined direction;
   an on-screen image generating section which is a portion of the display section and includes a plurality of blocks;
   a determining section that determines whether or not a part of said sub-image data is displayed in each block of the plurality of blocks into which said pixel line is divided, when said display section displays said sub-image data;
   a plurality of block storing sections, each of which stores said part of said sub-image data displayed on said block;
   a reading out section that reads out said part of said sub-image data displayed on said block from a storing section, and then causes any one of a plurality of said block storing sections to store said read out part of said sub-image data, when said determining section determines that said part of said sub-image data is displayed;
   a generating section that generates compound sub-image part data obtained by compounding said parts of said respective sub-image data stored in said block storing sections, respectively, when all said parts of said sub-image data, which are determined to be displayed, are stored in a plurality of said block storing sections by said reading out section, for one block of a plurality of said divided blocks; and
   a superposing and outputting section that generates superposed image data obtained by superposing said compound sub-image part data corresponding to each of said blocks of said pixel line, respectively, on said main image data corresponding to said pixel line, and then outputs said generated superposed image data on said displaying section.

18. The digital camera as claimed in claim 17, further comprising:
   a line storing section that stores data stored in said block storing sections which are identical in number with said blocks;
   a storing control section that causes said line storing section to store said compound sub-image part data when said compound sub-image part data is generated;
   a transmitting section that transmits a reference signal used for displaying an image on said displaying section; and
   a line outputting section that outputs said compound sub-image part data stored in said line storing section corresponding to each of said blocks of said pixel line, respectively, to said superposing and outputting section, in synchronization with said reference signal transmitted from said transmitting section, after each of said compound sub-image part data has been stored in said line storing section by control of said storing control section for all said blocks of one of said pixel lines.

19. The digital camera as claimed in claim 17, wherein each of said sub-image data stored in said storing section comprises an image information table including, with respect to a sub-image, at least one of an image data file name, an image data storing address, an image data vertical size, an image data transverse size, an image data arrangement position, an image data mixing ratio, and a priority.

20. The digital camera as claimed in claim 17, wherein said sub-image data includes said sub-image data size and said sub-image data arrangement position with respect to a sub-image, and said determining section determines whether or not said sub-image data superposes in said arrangement position of said respective blocks based on said sub-image data size and said sub-image data arrangement position.

* * * * *